US 8,538,276 B2

United States Patent
Shimada et al.

(10) Patent No.: US 8,538,276 B2
(45) Date of Patent: Sep. 17, 2013

(54) METHOD AND APPARATUS FOR VISIBLE LIGHT COMMUNICATION WITH IMAGE PROCESSING

(75) Inventors: Shigehito Shimada, Chiba (JP); Hideki Ueno, Urayasu (JP); Minoru Fujita, Kawasaki (JP); Atsushi Kataoka, Yokohama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 326 days.

(21) Appl. No.: 12/855,542

(22) Filed: Aug. 12, 2010

(65) Prior Publication Data

US 2011/0052214 A1   Mar. 3, 2011

(30) Foreign Application Priority Data

Sep. 2, 2009   (JP) .................. 2009-202917

(51) Int. Cl.
*H04B 10/06*   (2006.01)
(52) U.S. Cl.
USPC ........... 398/202; 398/130; 398/172; 398/118; 382/202
(58) Field of Classification Search
USPC ................ 398/202, 130, 172, 118; 382/267, 382/202
See application file for complete search history.

(56) References Cited

U.S. PATENT DOCUMENTS

| 4,882,776 | A | 11/1989 | Uzawa et al. |
| 2004/0080671 | A1 | 4/2004 | Siemens et al. |
| 2007/0240191 | A1 | 10/2007 | Singh et al. |
| 2008/0129879 | A1 | 6/2008 | Shao et al. |
| 2009/0033757 | A1 | 2/2009 | Shimada |
| 2009/0129781 | A1* | 5/2009 | Irie et al. ................ 398/98 |
| 2010/0028021 | A1 | 2/2010 | Shimada et al. |
| 2010/0067916 | A1 | 3/2010 | Suzuki et al. |
| 2013/0038610 | A1* | 2/2013 | Origuchi et al. ............ 345/419 |

FOREIGN PATENT DOCUMENTS

| EP | 0 083 127 A1 | 7/1983 |
| JP | 2003-069507 | 3/2003 |
| JP | 2004-64465 | 2/2004 |
| JP | 2008-039494 | 2/2008 |
| JP | 2008-085550 | 4/2008 |

(Continued)

OTHER PUBLICATIONS

Yamasato et al: the english version of JP2009-88704, which was translated by machine, 2009.*

(Continued)

*Primary Examiner* — Kim Vu
*Assistant Examiner* — Ruiping Li
(74) *Attorney, Agent, or Firm* — Finnegan, Henderson, Farabow, Garrett & Dunner, LLP

(57) ABSTRACT

According to one embodiment, a visible-light communication apparatus includes an image input unit, a calculation unit, a preamble detection unit, a bit train detection unit, and a reception unit. The image input unit is configured to input image data generated by photographing a source of visible light carrying data. The calculation unit is configured to generate, from the image data, luminance data about an image at a designated position. The preamble detection unit is configured to detect a preamble at the head of the data, on the basis of the luminance data. The bit train detection unit is configured to detect the data bit train from the image data, in accordance with the preamble. The reception unit is configured to reproduce the data from the data bit train.

9 Claims, 3 Drawing Sheets

(56) References Cited

FOREIGN PATENT DOCUMENTS

| | | |
|---|---|---|
| JP | 2008-085555 | 4/2008 |
| JP | 2009-88704 | 4/2009 |
| JP | 2009-130725 | 6/2009 |
| JP | 2009-139137 | 6/2009 |
| JP | 2009-218898 | 9/2009 |
| WO | WO 2007/111484 A1 | 10/2007 |

OTHER PUBLICATIONS

German Office Action dated Aug. 23, 2011 (17 pages total).
Notification for Filing Issued by the Korean Patent Office in Applicaton No. 10-2010-0074922, Mailed Sep. 29, 2011 (8 pages total).
First Office Action issued by Japanese Patent Office in corresponding Application No. 2009-202917 dated Apr. 9, 2013, 7 pages.

* cited by examiner

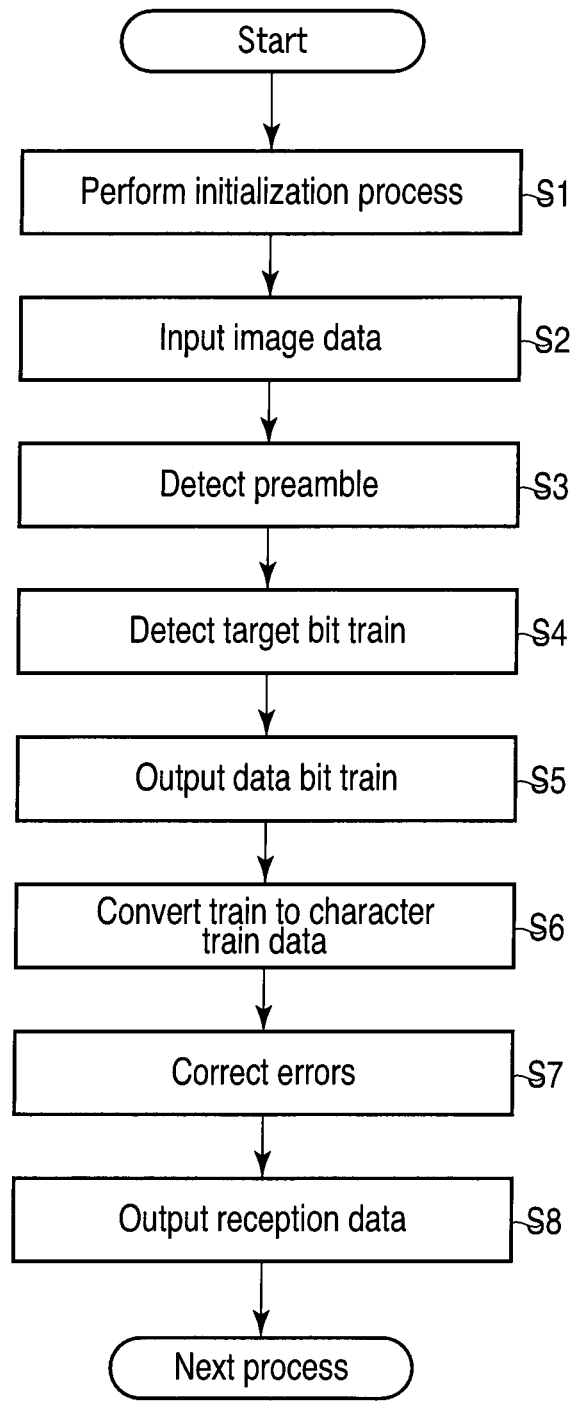
F I G. 4

US 8,538,276 B2

METHOD AND APPARATUS FOR VISIBLE LIGHT COMMUNICATION WITH IMAGE PROCESSING

CROSS-REFERENCE TO RELATED APPLICATIONS

This application is based upon and claims the benefit of priority from Japanese Patent Application No. 2009-202917, filed Sep. 2, 2009; the entire contents of which are incorporated herein by reference.

FIELD

Embodiments described herein relate generally to a visible-light communication apparatus that receives data from the image represented by visible light.

BACKGROUND

In recent years, visible-light communication apparatuses have been developed, each designed to transmit and receive data by modulating and demodulating visible light with the data. The visible-light communication apparatus has a reception unit that uses an image sensor to acquire the data carried by the visible light transmitted after undergoing image processing. The reception unit is composed of an optical system including lenses, an image sensor and an image processing unit.

The reception unit indeed determines the state of receiving visible light at the photographing object confirming unit provided in a digital photographing apparatus. In order to achieve reliable acquisition of the data transmitted by visible-light communication, however, image processing must be performed to extract the data in the form of a data bit train. Moreover, the data must be processed by a simple and inexpensive image processing apparatus, not by a complex and expensive image processing apparatus.

BRIEF DESCRIPTION OF THE DRAWINGS

FIG. 4 is a flowchart explaining the operation of the visible-light communication apparatus according to the embodiment.

DETAILED DESCRIPTION

In general, according to one embodiment, a visible-light communication apparatus includes an image input unit, a calculation unit, a preamble detection unit, a bit train detection unit, and a reception unit. The image input unit is configured to input image data generated by photographing a source of visible light carrying data. The calculation unit is configured to generate, from the image data, luminance data about an image at a designated position. The preamble detection unit is configured to detect a preamble at the head of the data, on the basis of the luminance data. The bit train detection unit is configured to detect the data bit train from the image data, in accordance with the preamble. The reception unit is configured to reproduce the data from the data bit train.

Embodiments will be described, with reference to the accompanying drawings.

[Configuration of the Visible-Light Communication Apparatus]

Figure 1:
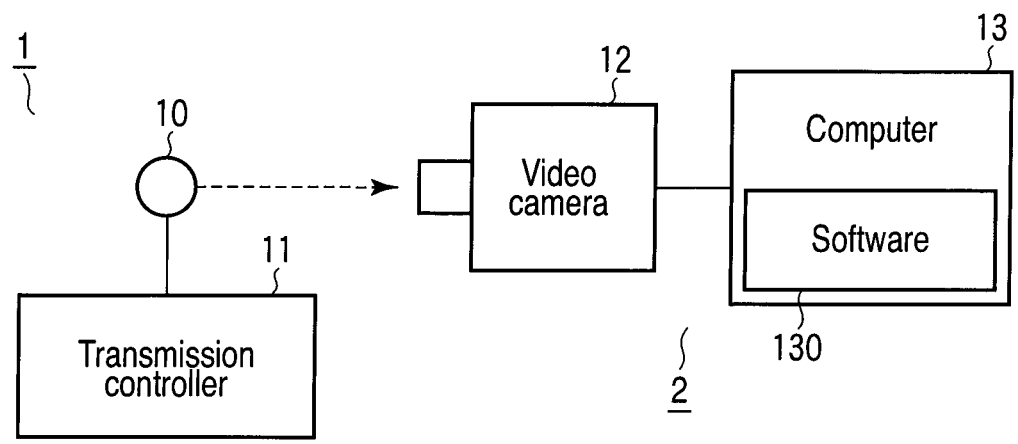
FIG. 1 is a block diagram explaining the configuration of a visible-light communication apparatus according to an embodiment.

FIG. 1 is a block diagram explaining the configuration of a visible-light communication apparatus according to an embodiment.

As FIG. 1 shows, the visible-light communication apparatus is composed mainly of a transmission device 1 and a reception device 2. The visible-light communication apparatus according to this embodiment is characterized by the reception device 2.

As shown in FIG. 1, the transmission device 1 has a light source 10 and a transmission controller 11. The transmission controller 11 controls the light source 10. Controlled by the transmission controller 11, the light source 10 emits visible light modulated with transmission data supplied from a transmission unit (not shown).

The reception device 2 receives the visible light coming from the transmission device 1, and performs a reception process, demodulating the visible light and acquiring the transmission data. The reception device 2 is composed mainly of a camera 12 and a computer 13.

The camera 12 incorporates an image sensor such as a CCD or a CMOS, and outputs image data representing an image of an object photographed, including the light source 10. The computer 13 is, for example, a personal computer, and incorporates image-processing software 130 that is indispensable for the visible light communication according to this embodiment. The computer 13 executes the software 130, demodulating the visible light to acquire the data (transmission data) from the image (image data) the camera 12 has photographed.

Figure 2:
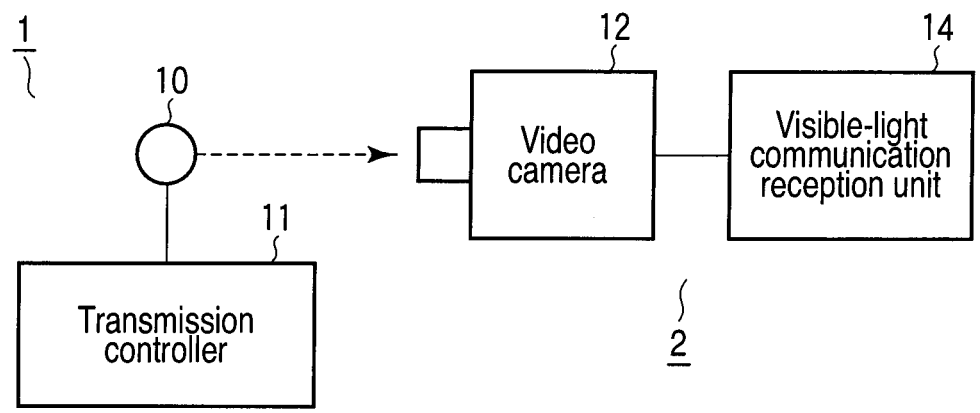
FIG. 2 is a block diagram explaining the configuration of a visible-light communication apparatus according to another embodiment.

FIG. 2 is a block diagram explaining the configuration of a visible-light communication apparatus according to another embodiment. As shown in FIG. 2, the reception device 2 of this embodiment is a dedicated visible-light reception device 14, not the computer 13 incorporating incorporates image-processing software 130. The visible-light reception device 14 is composed mainly of hardware, and demodulates visible light to acquire data (transmission data) from the image (image data) output from the camera 12.

[Advantages of the Visible-Light Communication Apparatus]

How the visible-light communication apparatus according to the embodiment operates will be explained with reference to FIG. 3 and the flowchart of FIG. 4.

In the transmission apparatus 1 of FIG. 1, the transmission controller 11 controls the light source 10. Controlled by the transmission controller 11, the light source 10 emits visible light modulated with transmission data supplied from a transmission unit (not shown), as is illustrated in FIG. 1. The transmission data is composed of a preamble (head part of data), later described, and a data bit train (coded data, i.e., main part of data).

The camera 12 of the reception device 2 photographs the object including the light source 10 and outputs image data representing the object. How the reception device 2 receives the data in this embodiment will be explained, with reference to FIGS. 3 and 4.

Figure 3:
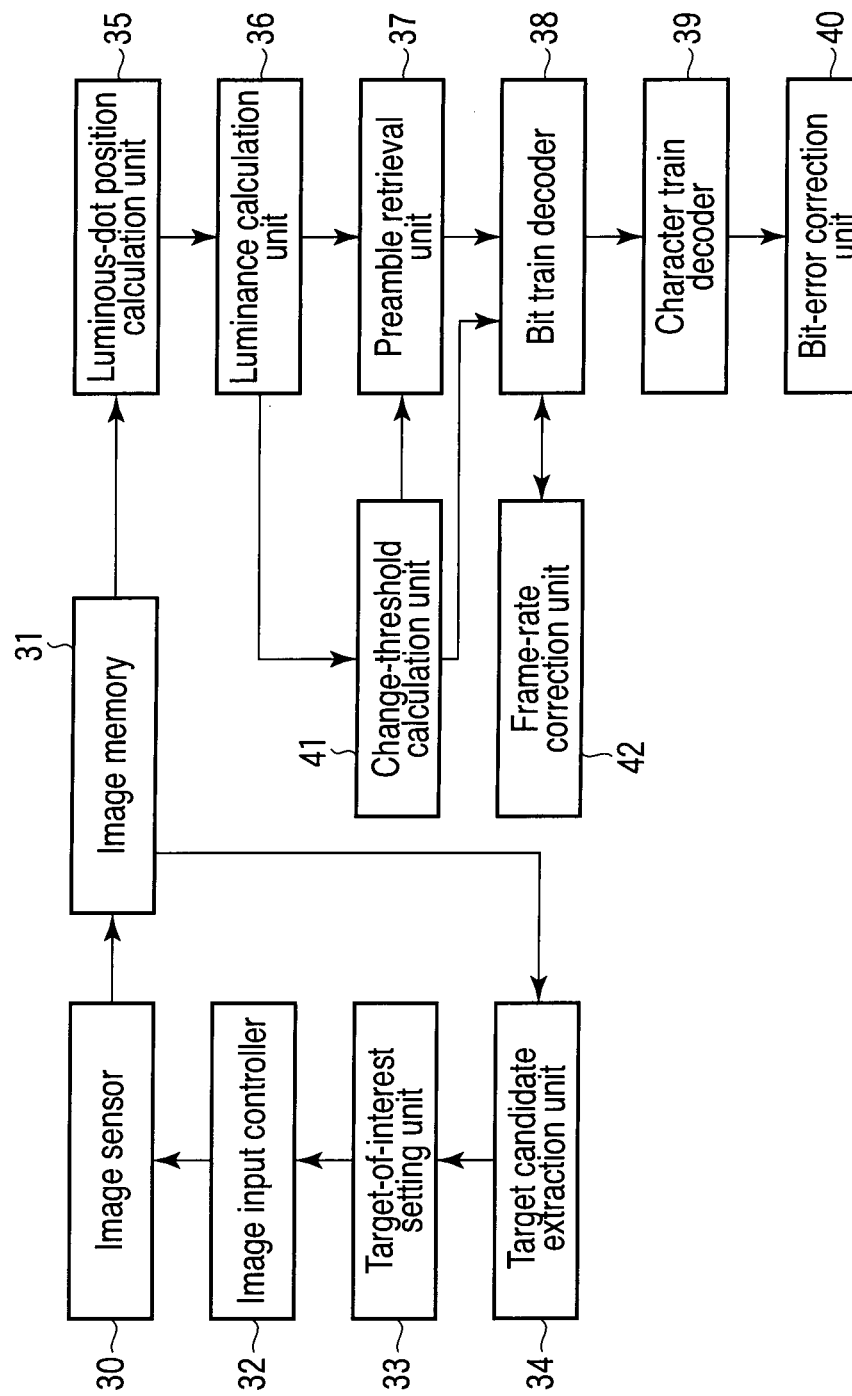
FIG. 3 is a block diagram showing a detailed configuration of the visible-light communication apparatus according to the embodiment.

As shown in FIG. 3, the reception device 2 has an image sensor 30, a memory 31, an image input controller 32 and other units 33 to 42. All components of the reception device 2, but the image sensor 30 and image memory 31, are constituted by the hardware and software 130 of the computer 13.

As FIG. 4 shows, the computer 13 performs an initialization process, setting the camera 12 to various operating modes and setting a timer in preparation for receiving image data (Step S1). The image sensor 30, which is incorporated in the camera 12, acquires image data about the object (including the light source 10). The computer 13 receives the data representing the image of the object (including the light source 10), for example as 16-frames/second image data representing the image photographed at the frame rate of the camera 12 (Step S2). The frames of the image data thus input are sequentially stored in the image memory 31.

The computer 13 processes the image data stored in the image memory 31, frame by frame. Then, the computer 13 extracts (demodulates) the data bit train modulated at the blinking frequency of the light source 10, which corresponds to the on-off frequency of a pulse signal, and then stores the data bit train in an internal unit memory (Step S4). The computer 13 further converts the data bit train to character train data (character code train), which is output as reception data (Step S6).

As will be described later, the computer 13 performs a process before the bit train decoder 38 extracts (detects) the data bit train. That is, the computer 13 detects the preamble that precedes the data bit train in the transmission data (Step S3). The process of detecting the preamble will be explained in detail, with reference to FIG. 3.

First, the image input controller 32 is set to receive the entire image data from the image sensor 30. This image data represents a designated number of frames (16 frames in this case). Hence, 16 frames of image are sequentially stored in the image memory 31. Next, the target candidate extraction unit 34 extracts, as a target candidate (i.e., unit image), any luminous dot that greatly changes in luminance, from frame to frame, over the entire image data representing the designated number of frames, and determines the position of the target candidate.

If two or more target candidates have been extracted, the target candidate extraction unit 34 records all target candidates. Then, the target-of-interest setting unit 33 selects one of the target candidates and sets regions of interest that surround the luminous dot (i.e., target candidate selected) to the image input controller 32. The image input controller 32 controls the image sensor 30, causing the same to output the image data of the regions of interest only (i.e., part of image) at a high rate. This image data is stored in the image memory 31.

The luminous-dot position calculation unit 35 calculates the position the luminous dot assumes in the region of interest of the image data. Then, the luminance calculation unit 36 calculates the luminance at the position calculated by the luminous-dot position calculation unit 35. The luminance calculation unit 36 further generates luminance data representing the luminance calculated. The luminance data is time-series data for the numbers assigned to a group of sequential frames (i.e., 16 frames) photographed sequentially.

The luminance calculation unit 36 outputs the luminance data to the preamble retrieval unit 37 and the change-threshold calculation unit 41. The change-threshold calculation unit 41 calculates not only the maximum luminance and the minimum luminance from the luminance data, but also a threshold value for the blinking frequency of the light source 10, which corresponds to the on-off frequency of the pulse signal. The change-threshold calculation unit 41 outputs the threshold value to the preamble retrieval unit 37 and bit train decoder 38.

The preamble retrieval unit 37 retrieves the preamble, i.e., the head part of the transmission data, for each image data item (namely, a group of frames, or 16 frames in this case), by utilizing the threshold value calculated by the change-threshold calculation unit 41 (Step S3). More specifically, the preamble retrieval unit 37 outputs the luminance data for the frame having the maximum luminance as preamble if the on-time or off-time of the pulse signal satisfy prescribed conditions. In other words, the preamble retrieval unit 37 detects, as preamble, the first pulse that appears in the pulse signal every time the light source 10 emits light.

The bit train decoder 38 converts the luminance data following the preamble detected by the preamble retrieval unit 37, to a data bit train (Step S4). Then, the bit train decoder 38 outputs the data bit train to the character train decoder 39 (Step S5). The bit train decoder 38 calculates the position of the preamble, data size (1 byte) thereof and the size of the data bit train (i.e., main part of data), from the luminance data for one frame. The frame-rate correction unit 42 calculates the bit position of the data bit train, on the basis of the precision of consecutive sub-frames, and corrects the bit position. The frame-rate correction unit 42 generates data representing the corrected bit position and output this data to the bit train decoder 38.

The character train decoder 39 receives the data bit train (coded data) from the bit train decoder 38 and converts (decodes) the data bit train to character train data (Step S6). The bit-error correction unit 40 detects errors in the character train data and corrects the errors (Step S7). Alternatively, the bit-error correction unit 40 may discard character train data in which errors have been detected.

The above-mentioned processes of setting regions of interest, inputting image data, decoding the data bit train, decoding the character train and correcting bit errors are performed in sequence for the first target candidate. Thereafter, these processes are repeated for all other target candidates.

As described above, in the visible-light communication apparatus according to this embodiment, the image sensor 30 incorporated in the camera 12 continuously receives the image of the object of photography, including the light source 10. The image data representing this image is processed, and the data bit train modulated as the light source 10 blinks is extracted (demodulated). Therefore, the preamble, which is the heat part of the data bit train, can thereby be reliably detected before the bit train decoder 38 detects the data bit train in the visible-light communication apparatus according to this embodiment. Hence, the data bit train (coded data), which is the main part of data, following the preamble, can reliably be extracted from the input image data.

In other words, the data transmitted by means of visible light communication can be reliably extracted from the image the camera 12 has photographed. Thus, this embodiment can achieve the image processing for receiving data, by using a simple and inexpensive image processing apparatus such as the personal computer 13 incorporating image-processing software 130.

In the image processing method according to this embodiment, the function units 30 to 36 shown in FIG. 3 can automatically locate the light source 10 in the image the camera 12 has photographed. Moreover, the light source 10 can be tracked in the transmission device 1 if it moves while the reception device 2 is receiving the image data. Furthermore, if the image shows a plurality of light sources 10, the reception device 2 can receive a plurality of data items from the transmission device 1 merely by detecting the light sources 10.

In brief, the present embodiment can detect the preamble of the data carried by visible light, on the basis of the luminance of an image photographed of the source of the visible light. In accordance with the preamble thus detected, the data bit train transmitted can be extracted from the image data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for performing visible light communication, comprising:
   an image input unit configured to input image data representing an image photographed of a light source of visible light carrying transmission data, the transmission data including a preamble and a data bit train;
   a calculation unit configured to calculate from the image data, a luminance value at a designated position in a region of interest of the image data;
   a change-threshold calculation unit configured to (i) calculate a maximum luminance and a minimum luminance from the luminance value and (ii) calculate a threshold value for detecting a blinking frequency of the light source corresponding to an on-off frequency of pulse signals of the transmission data;
   a preamble detection unit configured to detect the preamble from the image data based on the threshold value of the luminance value;
   a bit train detection unit configured to detect the data bit train, from the image data, based on the threshold value and the preamble; and
   a reception unit configured to reproduce the transmission data based on the data bit train.

2. The apparatus of claim 1, wherein the image input unit is configured to receive image data for each frame, one after another and the calculation unit is configured to calculate the luminance value from the image data for each frame.

3. The apparatus of claim 1, wherein the preamble detection unit is configured to detect the preamble if the on-time and off-time of the pulse signals satisfy prescribed conditions.

4. The apparatus of claim 1, further comprising an extraction unit configured to extract the region of interest having a luminous dot at which the luminance value of the image data greatly changes,
   wherein the image input unit is configured to receive the image data associated with the region of interest.

5. The apparatus of claim 4, further comprising a luminous-dot position calculation unit configured to calculate a position of the luminous dot for the image data associated with the region of interest,
   wherein the calculation unit is configured to calculate the luminance value at the position of the luminous dot.

6. The apparatus of claim 1, further comprising a correction unit configured to correct bit displacement in a data bit train detected by the bit train detection unit, on the basis of a change in a frame rate of the image data.

7. The apparatus of claim 1, wherein the image input unit includes a camera incorporating an image sensor.

8. The apparatus of claim 1, wherein the reception unit is configured to convert the data bit train detected by the bit train detection unit to character train data.

9. A method of receiving data from visible light in visible light communication, the method comprising:
   inputting image data representing an image photographed of a light source of visible light carrying transmission data, the transmission data including a preamble and a data bit train;
   calculating, from the image data, a luminance value at a designated position in a region of interest of the image data;
   calculating (i) a maximum luminance and a minimum luminance from the luminance value and (ii) a threshold value for detecting a blinking frequency of the light source corresponding to an on-off frequency of pulse signals of the transmission data;
   detecting the preamble from the image data based on the threshold value of the luminance value;
   detecting the data bit train, from the image data, based on the threshold value and the preamble; and
   reproducing the transmission data based on the data bit train.

* * * * *